US012651915B2

(12) United States Patent
Ono et al.

(10) Patent No.: US 12,651,915 B2
(45) Date of Patent: Jun. 9, 2026

(54) STORAGE BATTERY CONTROL DEVICE, ENERGY STORAGE SYSTEM, AND STORAGE BATTERY CONTROL METHOD

(71) Applicant: Yazaki Corporation, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 633 days.

(21) Appl. No.: 17/873,753

(22) Filed: Jul. 26, 2022

(65) Prior Publication Data

US 2023/0032370 A1    Feb. 2, 2023

(30) Foreign Application Priority Data

Jul. 28, 2021    (JP) ................................. 2021-123002

(51) Int. Cl.
*H02J 7/54* (2026.01)
*H02J 7/82* (2026.01)
*H02J 7/96* (2026.01)

(52) U.S. Cl.
CPC ................ *H02J 7/54* (2026.01); *H02J 7/825* (2026.01); *H02J 7/96* (2026.01)

(58) Field of Classification Search
CPC ...... H02J 7/0016; H02J 7/0014; H02J 7/0013; H02J 7/0047; H02J 7/0048
See application file for complete search history.

(56) References Cited

U.S. PATENT DOCUMENTS

| | | | | |
|---|---|---|---|---|
| 2010/0079116 A1* | 4/2010 | Thivierge | ................ | B60L 58/22 |
| | | | | 320/153 |
| 2011/0057617 A1* | 3/2011 | Finberg | ................. | H02J 7/0016 |
| | | | | 320/122 |

| | | | | |
|---|---|---|---|---|
| 2013/0302657 A1 | 11/2013 | Itakura | | |
| 2020/0028375 A1* | 1/2020 | Ono | .................... | H01M 10/441 |
| 2022/0140620 A1* | 5/2022 | Kang | ................. | G01R 31/3842 |
| | | | | 320/118 |

FOREIGN PATENT DOCUMENTS

| | | | | |
|---|---|---|---|---|
| CN | 105958570 A | * | 9/2016 | ............. H02J 7/0016 |
| EP | 3154119 A1 | * | 4/2017 | .......... H02J 7/00711 |
| JP | 2013-31249 A | | 2/2013 | |
| JP | 2013-240155 A | | 11/2013 | |

* cited by examiner

*Primary Examiner* — Julian D Huffman
*Assistant Examiner* — John P Ondrasik
(74) *Attorney, Agent, or Firm* — Sughrue Mion, PLLC

(57) ABSTRACT

A storage battery control device for controlling an energy storage system including storage battery rows connected in parallel, each of the storage battery rows having a plurality of storage batteries connected in series and bypass units each of which bypasses corresponding one of the storage batteries, and a switching unit that switches connection and disconnection of the storage battery rows. The storage battery control device executes: charging processing of charging the storage battery rows connected in parallel, first detection processing of detecting a fully charged storage battery during execution of the charging processing, second detection processing of detecting a storage battery having a highest potential among the storage batteries being charged in another storage battery row different from the storage battery row including the fully charged storage battery, and bypass processing of bypassing the storage battery detected in the first detection processing and the second detection processing.

6 Claims, 3 Drawing Sheets

STORAGE BATTERY CONTROL DEVICE, ENERGY STORAGE SYSTEM, AND STORAGE BATTERY CONTROL METHOD

CROSS-REFERENCE TO RELATED APPLICATIONS

This application is based on and claims priority under 35 USC 119 from Japanese Patent Application No. 2021-123002 filed on Jul. 28, 2021, the contents of which are incorporated herein by reference.

TECHNICAL FIELD

The present disclosure relates to a storage battery control device, an energy storage system, and a storage battery control method.

BACKGROUND ART

As a system that controls charging of a battery device in which a plurality of batteries are connected in series, there is known a system in which a battery to be avoided to be charged is selected based on a state of each battery, and other batteries are charged by bypassing the battery to be avoided to be charged (for example, see JP-A-2013-31249). As a system including a battery cell group in which a plurality of battery cell rows are connected in parallel, each of the plurality of battery cell rows including a plurality of battery cells connected in series, there is known a system in which a connection configuration of battery cells is changed to a state in which the battery cells are exchanged between battery cell rows such that an evaluation value indicating a sound state of each battery cell row becomes a predetermined threshold value or larger when a battery cell is determined to be deteriorated (for example, see JP-A-2013-240155).

In systems disclosed in JP-A-2013-31249 and JP-A-2013-240155, charging and discharging can be performed in units of battery cells by bypassing the battery cell. In the system disclosed in JP-A-2013-240155, it is possible to achieve a large capacity by connecting the battery cell rows in parallel.

In a system in which a plurality of battery cell rows are connected in parallel, every time bypass control on a battery cell is executed during a progress of charging or discharging, a total voltage of a battery cell row including the bypassed battery cell changes in a stepwise manner, and a difference occurs between total voltages of the battery cell rows. When a plurality of battery cell rows having different total voltages are connected in parallel, a circulating current flows from a battery cell row having a high total voltage to a battery cell row having a low total voltage. Therefore, when the circulating current exceeds an allowable range, the plurality of battery cell rows cannot be connected in parallel, and a large capacity cannot be achieved.

There is a known balancing method according to related art, in which electric power of a battery cell fully charged in a battery cell row is consumed to continue charging of other battery cells, but electric power loss increases in a large-scale energy storage system or an energy storage system in which battery cells having largely different capacities are mixed.

SUMMARY OF INVENTION

In view of the above circumstances, an object of the present disclosure to provide a storage battery control device for an energy storage system in which a plurality of storage battery rows are connected in parallel, the storage battery control device being capable of connecting the plurality of storage battery rows in parallel while sufficiently suppressing a circulating current between the storage battery rows, and being capable of discharging the plurality of storage battery rows when switching to discharging during charging, an energy storage system, and a storage battery control method.

SOLUTION TO PROBLEM

According to an aspect of the present disclosure, there is provided a storage battery control device configured to control an energy storage system including: a plurality of storage battery rows connected in parallel, each of the storage battery rows including a plurality of storage batteries connected in series and a plurality of bypass units each of which bypasses corresponding one of the storage batteries; and a switching unit configured to switch connection and disconnection of the plurality of storage battery rows. The storage battery control device executes: charging processing of charging the plurality of storage battery rows in a state in which the plurality of storage battery rows are connected in parallel by the switching unit; first detection processing of detecting a fully charged storage battery during execution of the charging processing; second detection processing of detecting a storage battery having a highest potential among the storage batteries being charged in another storage battery row different from the storage battery row including the fully charged storage battery detected in the first detection processing among the plurality of storage battery rows; and bypass processing of bypassing the storage battery detected in the first detection processing and all storage batteries detected in the second detection processing by the bypass units in a state in which the plurality of storage battery rows are disconnected by the switching unit.

According to an aspect of the present disclosure, there is provided an energy storage system that includes: a plurality of storage battery rows connected in parallel, each of the storage battery rows including a plurality of storage batteries connected in series and a plurality of bypass unit each of which bypasses corresponding one of the storage batteries; a switching unit configured to switch connection and disconnection of the plurality of storage battery rows; and a control device configured to control the bypass units and the switching unit. The control device executes: charging processing of charging the plurality of storage battery rows in a state in which the plurality of storage battery rows are connected in parallel by the switching unit; first detection processing of detecting a fully charged storage battery during execution of the charging processing; second detection processing of detecting a storage battery having a highest potential among the storage batteries being charged in another storage battery row different from the storage battery row including the fully charged storage battery detected in the first detection processing among the plurality of storage battery rows; and bypass processing of bypassing the storage battery detected in the first detection processing and all storage batteries detected in the second detection processing by the bypass units in a state in which the plurality of storage battery rows are disconnected by the switching unit.

According to an aspect of the present disclosure, there is provided a storage battery control method for controlling an energy storage system using a computer, the energy storage system including: a plurality of storage battery rows connected in parallel, each of the storage battery rows including a plurality of storage batteries connected in series and a plurality of bypass units each of which bypasses corresponding one of the storage batteries; and a switching unit configured to switch connection and disconnection of the plurality of storage battery rows. The storage battery control method includes: charging processing of charging the plurality of storage battery rows in a state in which the plurality of storage battery rows are connected in parallel by the switching unit; first detection processing of detecting a fully charged storage battery during execution of the charging processing; second detection processing of detecting a storage battery having a highest potential among the storage batteries being charged in another storage battery row different from the storage battery row including the fully charged storage battery detected in the first detection processing among the plurality of storage battery rows; and bypass processing of bypassing the storage battery detected in the first detection processing and all storage batteries detected in the second detection processing by the bypass units in a state in which the plurality of storage battery rows are disconnected by the switching unit.

According to the present disclosure, in the energy storage system in which the plurality of storage battery rows are connected in parallel, it is possible to connect the plurality of storage battery rows in parallel while sufficiently suppressing a circulating current between the storage battery rows, and to discharge the plurality of storage battery rows when switching to discharging during charging.

DESCRIPTION OF EMBODIMENT

Hereinafter, the present disclosure will be described with reference to a preferred embodiment. The present disclosure is not limited to the embodiment to be described below, and the embodiment can be appropriately modified without departing from the scope of the present disclosure. Although some configurations are not illustrated or described in the embodiment to be described below, a known or well-known technique is appropriately applied to details of an omitted technique within a range in which no contradiction occurs to contents to be described below.

Figure 1:
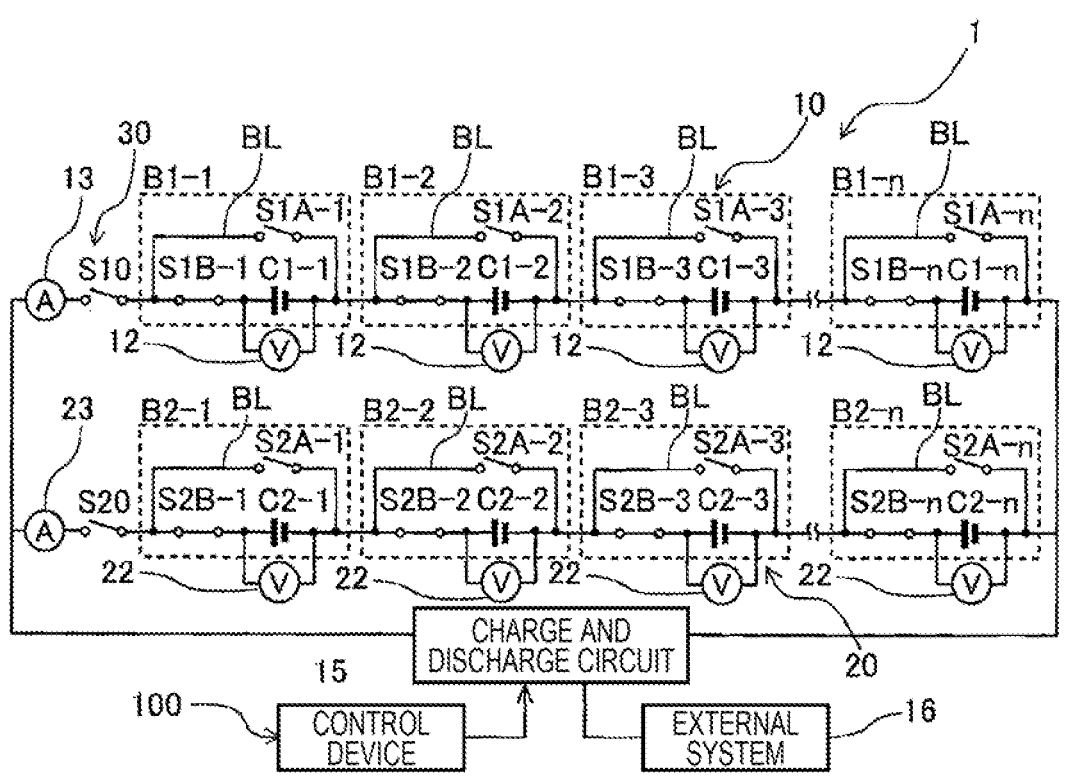
FIG. 1 is a diagram schematically showing an energy storage system including a control device according to an embodiment of the present disclosure.

FIG. 1 is a diagram schematically showing an energy storage system 1 including a control device 100 according to an embodiment of the present disclosure. As shown in this drawing, the energy storage system 1 includes a first storage battery row 10, a second storage battery row 20, a switching unit 30, a charge and discharge circuit 15, and a control device 100. The energy storage system 1 is an in-vehicle or stationary power supply.

The first storage battery row 10 includes n (n is an integer of 2 or larger) storage batteries C1-1 to C1-n connected in series. The second storage battery row 20 includes n storage batteries C2-1 to C2-n connected in series. The storage batteries C1-1 to C1-n included in the first storage battery row 10 may be collectively referred to as storage batteries C1-x. The storage batteries C2-1 to C1-n included in the second storage battery row 20 may be collectively referred to as storage batteries C2-x.

Each of the storage batteries C1-x, C2-x is a storage battery cell, or a storage battery module or a storage battery pack in which a plurality of storage battery cells are connected. Each of the storage batteries C1-x, C2-x is a secondary battery such as a lithium ion battery and a lithium ion capacitor. Although not particularly limited, each of the storage batteries C1-x, C2-x according to the present embodiment is obtained by regenerating a used battery used in a vehicle or the like, and there is a difference in degree of deterioration between the storage batteries C1-x, C2-x. When these storage batteries C1-x, C2-x are combined to form the first storage battery row 10 and the second storage battery row 20, deterioration states of the storage batteries C1-x, C2-x are measured and selected according to battery capacities, and then the storage batteries C1-x, C2-x are combined such that a total capacity of the energy storage system 1 satisfies a required capacity. It is not necessary to make degree of deterioration of the storage batteries C1-x of the first storage battery row 10 and degree of deterioration of the storage batteries C2-x of the second storage battery row 20 equal to each other, and it is sufficient that a total capacity of the first storage battery row 10 and a total capacity of the second storage battery row 20 satisfy requirements of the energy storage system 1.

These storage batteries C1-x, C2-x are charged by being supplied with electric power from an external system 16 through the charge and discharge circuit 15, and discharge the charged electric power through the charge and discharge circuit 15 to supply the electric power to the external system 16. Here, the external system 16 includes a load, a power generator, and the like. When the energy storage system 1 is used in a vehicle, a driving motor, an air conditioner, various in-vehicle electrical components, and the like serve as the load. The driving motor serves as the load and also serves as the power generator. When the energy storage system 1 is stationary, domestic appliances at home, a commercial power supply system, a liquid crystal display, a communication module, and the like serve as the load, and a photovoltaic power generation system and the like serve as the power generator.

The first storage battery row 10 and the second storage battery row 20 are connected in parallel to the charge and discharge circuit 15. The switching unit 30 includes a first switch S10 and a second switch S20. The first switch S10 is provided in the first storage battery row 10, and switches a connection/disconnection state between the first storage battery row 10 and the charge and discharge circuit 15. On the other hand, the second switch S20 is provided in the second storage battery row 20, and switches a connection/disconnection state between the second storage battery row 20 and the charge and discharge circuit 15. The first switch S10 may be provided between a starting end and a terminal end of the first storage battery row 10. Similarly, the second switch S20 may be provided between a starting end and a terminal end of the second storage battery row 20.

The first storage battery row 10 includes n (n is an integer of 2 or more) bypass circuits B1-1 to B1-n. The second storage battery row 20 includes n bypass circuits B2-1 to B2-n. The bypass circuits B1-1 to B1-n included in the first storage battery row 10 may be collectively referred to as bypass circuits B1-x. The bypass circuits B2-1 to B2-n included in the second storage battery row 20 may be collectively referred to as bypass circuits B2-x.

The bypass circuits B1-x are provided corresponding to the storage batteries C1 to Cx, respectively, and the bypass circuits B2-x are provided corresponding to the storage batteries C2 to Cx, respectively. Each of the bypass circuits B1-x includes a bypass line BL, one of bypass switches S1A-1 to S1A-n, and one of disconnection switches S1B-1 to S1B-n. Each of the bypass circuits B2-x includes the bypass line BL, one of bypass switches S2A-1 to S2A-n, and one of disconnection switches S2B-1 to S2B-n. The bypass switches S1A-1 to S1A-n included in the first storage battery row 10 may be collectively referred to as bypass switches S1A-x. The disconnection switches S1B-1 to S1B-n included in the first storage battery row 10 may be collectively referred to as disconnection switches S1B-x. The bypass switches S2A-1 to S2A-n included in the second storage battery row 20 may be collectively referred to as bypass switches S2A-x. The disconnection switches S2B-1 to S2B-n included in the second storage battery row 20 may be collectively referred to as disconnection switches S2B-x.

The bypass line BL is a power line that bypasses each of the storage batteries C1-x, C2-x. Each of the bypass switches S1A-x, S2A-x is provided on the bypass line BL. Each of the bypass switches S1A-x, S2A-x is, for example, a mechanical switch. Each of the disconnection switches S1B-x, S2B-x is provided between a positive electrode of one of the storage batteries C1-x, C2-x and one end of the bypass line BL. Each of the disconnection switches S1B-x, S2B-x is, for example, a semiconductor switch.

The storage batteries C1-1, C2-1 at starting ends are connected to the external system 16 such as a load via the charge and discharge circuit 15, and the storage batteries C1-n and C2-n at terminal ends are also connected to the external system 16 such as the load via the charge and discharge circuit 15. When the bypass switches S1A-x are turned off and the disconnection switches S1B-x are turned on in all the bypass circuits B1-x of the first storage battery row 10, all the storage batteries C1-x of the first storage battery row 10 are connected in series to the external system 16 such as the load via the charge and discharge circuit 15. On the other hand, when the disconnection switch S1B-x is turned off and the bypass switch S1A-x is turned on in any one of the bypass circuits B1-x of the first storage battery row 10, the storage battery C1-x corresponding to the bypass circuit B1-x is bypassed.

Similarly, when the bypass switches S2A-x are turned off and the disconnection switches S2B-x are turned on in all the bypass circuits B2-x of the second storage battery row 20, all the storage batteries C2-x of the second storage battery row 20 are connected in series to the external system 16 such as the load via the charge and discharge circuit 15. On the other hand, when the disconnection switch S2B-x is turned off and the bypass switch S2A-x is turned on in any one of the bypass circuits B2-x of the second storage battery row 20, the storage battery C2-x corresponding to the bypass circuit B2-x is bypassed.

The first storage battery row 10 includes a plurality of voltage measurement units 12 and a current measurement unit 13. The voltage measurement unit 12 is connected between positive and negative terminals of each of the storage batteries C1-x, and measures an inter-terminal voltage of each of the storage batteries C1-x. The current measurement unit 13 is provided at the starting end of the first storage battery row 10, and measures a charge/discharge current of the first storage battery row 10.

The second storage battery row 20 includes a plurality of voltage measurement units 22 and a current measurement unit 23. The voltage measurement unit 22 is connected between positive and negative terminals of each of the storage batteries C2-x, and measures an inter-terminal voltage of each of the storage batteries C2-x. The current measurement unit 23 is provided at the starting end of the second storage battery row 20, and measures a charge/discharge current of the second storage battery row 20.

Figure 2:
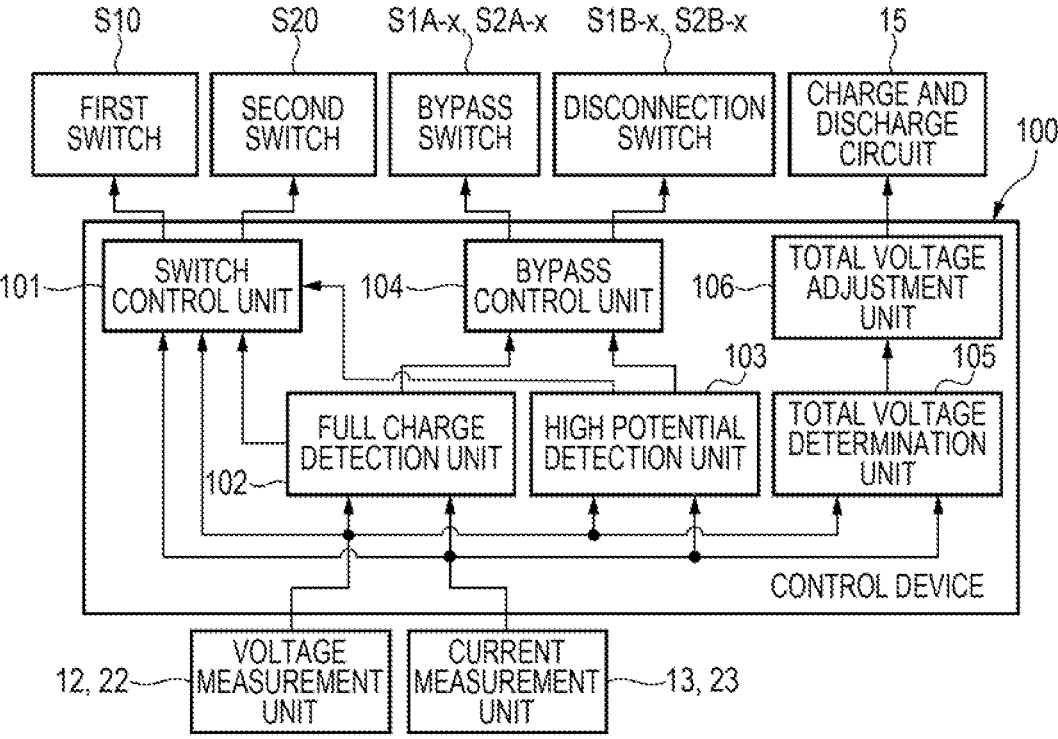
FIG. 2 is a block diagram showing functions of the control device shown in FIG. 1.

FIG. 2 is a block diagram showing functions of the control device 100 shown in FIG. 1. As shown in this drawing, the control device 100 includes a switch control unit 101, a full charge detection unit 102, a high potential detection unit 103, a bypass control unit 104, a total voltage determination unit 105, and a total voltage adjustment unit 106.

The switch control unit 101 controls ON/OFF of the first switch S10 and the second switch S20. When the first switch S10 and the second switch S20 are turned on by the switch control unit 101, the first storage battery row 10 and the second storage battery row 20 are connected in parallel to the charge and discharge circuit 15. On the other hand, when the first switch S10 is turned off by the switch control unit 101, the first storage battery row 10 is disconnected from the charge and discharge circuit 15, and when the second switch S20 is turned off by the switch control unit 101, the second storage battery row 20 is disconnected from the charge and discharge circuit 15.

The full charge detection unit 102 detects full charge of each of the storage batteries C1-x, C2-x. Here, as charging progresses, a voltage of each of the storage batteries C1-x, C2-x approaches a charge end voltage, and a charge current decreases. The full charge detection unit 102 detects the fully charged storage battery C1-x of the first storage battery row 10 based on voltage values of the storage batteries C1-x of the first storage battery row 10 output from the voltage measurement units 12 and a current value of the first storage battery row 10 output from the current measurement unit 13. The full charge detection unit 102 detects the fully charged storage battery C2-x of the second storage battery row 20 based on voltage values of the storage batteries C2-x of the second storage battery row 20 output from the voltage measurement units 22 and a current value of the second storage battery row 20 output from the current measurement unit 23.

When the fully charged storage battery C1-x is detected by the full charge detection unit 102 from among the storage batteries C1-x being charged in the first storage battery row 10, the high potential detection unit 103 detects the storage battery C2-x having the highest potential among the storage batteries C2-x of the second storage battery row 20. On the other hand, when the fully charged storage battery C2-x is detected by the fully charged detection unit 102 from among the storage batteries C2-x being charged in the second storage battery row 20, the high potential detection unit 103 detects the storage battery C1-x having the highest potential among the storage batteries C1-x of the first storage battery row 10.

The bypass control unit 104 controls ON/OFF switching of the bypass switches S1A-x, S2A-x and the disconnection switches S1B-x, S2B-x of the bypass circuits B1-x, B2-x. The bypass control unit 104 switches from a connection state in which the bypass switches S1A-x, S2A-x are turned off and the disconnection switches S1B-x, S2B-x are turned on to a bypass state in which the bypass switches S1A-x, S2A-x are turned on and the disconnection switches S1B-x, S2B-x are turned off via a state in which both switches are turned off.

The bypass control unit 104 bypasses the fully charged storage batteries C1-x, C2-x detected by the full charge detection unit 102 and the storage batteries C1-x, C2-x having the highest potentials detected by the high potential detection unit 103. Specifically, the bypass control unit 104 bypasses the fully charged storage battery C1-x of the first storage battery row 10 and the storage battery C2-x having the highest potential among the storage batteries C2-x being charged in the second storage battery row 20. The bypass control unit 104 bypasses the fully charged storage battery C2-x of the second storage battery row 20 and the storage battery C1-x having the highest potential among the storage batteries C1-x being charged in the first storage battery row 10. Thereby, a total voltage of the first storage battery row 10 and a total voltage of the second storage battery row 20 are maintained to be substantially equal to each other.

The total voltage determination unit 105 determines whether a difference between the total voltage of the first storage battery row 10 and the total voltage of the second storage battery row 20 is within a predetermined range before a start of charging. The "predetermined range" corresponds to an allowable range of the difference between the total voltage of the first storage battery row 10 and the total voltage of the second storage battery row 20 in which a circulating current between the first storage battery row 10 and the second storage battery row 20 is suppressed to an allowable range. The total voltage determination unit 105 obtains a difference between a total value of voltage values output from the plurality of voltage measurement units 12 of the first storage battery row 10 and a total value of voltage values output from the plurality of voltage measurement units 22 of the second storage battery row 20, and determines whether the difference is within the "predetermined range".

When the total voltage determination unit 105 determines that the difference between the total voltage of the first storage battery row 10 and the total voltage of the second storage battery row 20 is out of the predetermined range, the total voltage adjustment unit 106 adjusts the difference between the total voltage of the first storage battery row 10 and the total voltage of the second storage battery row 20 to be within the predetermined range. Specifically, when the difference between the total voltage of the first storage battery row 10 and the total voltage of the second storage battery row 20 is out of the predetermined range before the start of charging, the total voltage adjustment unit 106 controls the charge and discharge circuit 15 to charge the storage battery row having a lower total voltage, thereby adjusting the difference between the total voltage of the first storage battery row 10 and the total voltage of the second storage battery row 20 to be within the predetermined range. The total voltage adjustment unit 106 may adjust the difference between the total voltage of the first storage battery row 10 and the total voltage of the second storage battery row 20 to be within the predetermined range by discharging the storage battery row having a higher total voltage.

After bypass processing, the total voltage determination unit 105 determines whether a difference between a total voltage of the first storage battery row 10 and a total voltage of the second storage battery row 20 is within a predetermined range. The "predetermined range" corresponds to an allowable range of the difference between the total voltage of the first storage battery row 10 and the total voltage of the second storage battery row 20 in which a circulating current between the first storage battery row 10 and the second storage battery row 20 is suppressed to an allowable range when the storage batteries C1-x, C2-x close to full charge and the storage batteries C1-x, C2-x having the highest potentials among the storage batteries C1-x, C2-x being charged in the other storage battery rows 10, 20 are bypassed after the bypass processing. The total voltage determination unit 105 obtains a difference between a total value of voltage values output from the plurality of voltage measurement units 12 of the first storage battery row 10 and a total value of voltage values output from the plurality of voltage measurement units 22 of the second storage battery row 20, and determines whether the difference is within the "predetermined range".

After the bypass processing, when the total voltage determination unit 105 determines that the difference between the total voltage of the first storage battery row 10 and the total voltage of the second storage battery row 20 is out of the predetermined range, the total voltage adjustment unit 106 adjusts the difference between the total voltage of the first storage battery row 10 and the total voltage of the second storage battery row 20 to be within the predetermined range. Specifically, one storage battery row (one of the first and second storage battery rows 10, 20) including the storage batteries C1-x, C2-x close to full charge is disconnected by one of the first and second switches S10, S20, and the other storage battery row (the other of the first and second storage battery rows 10, 20) is continuously charged for a while. Then, after confirming that the difference between the total voltage of the first storage battery row 10 and the total voltage of the second storage battery row 20 falls within the predetermined range, the total voltage adjustment unit 106 connects the first storage battery row 10 and the second storage battery row 20 in parallel by the first and second switches S10, S20.

Figure 3:
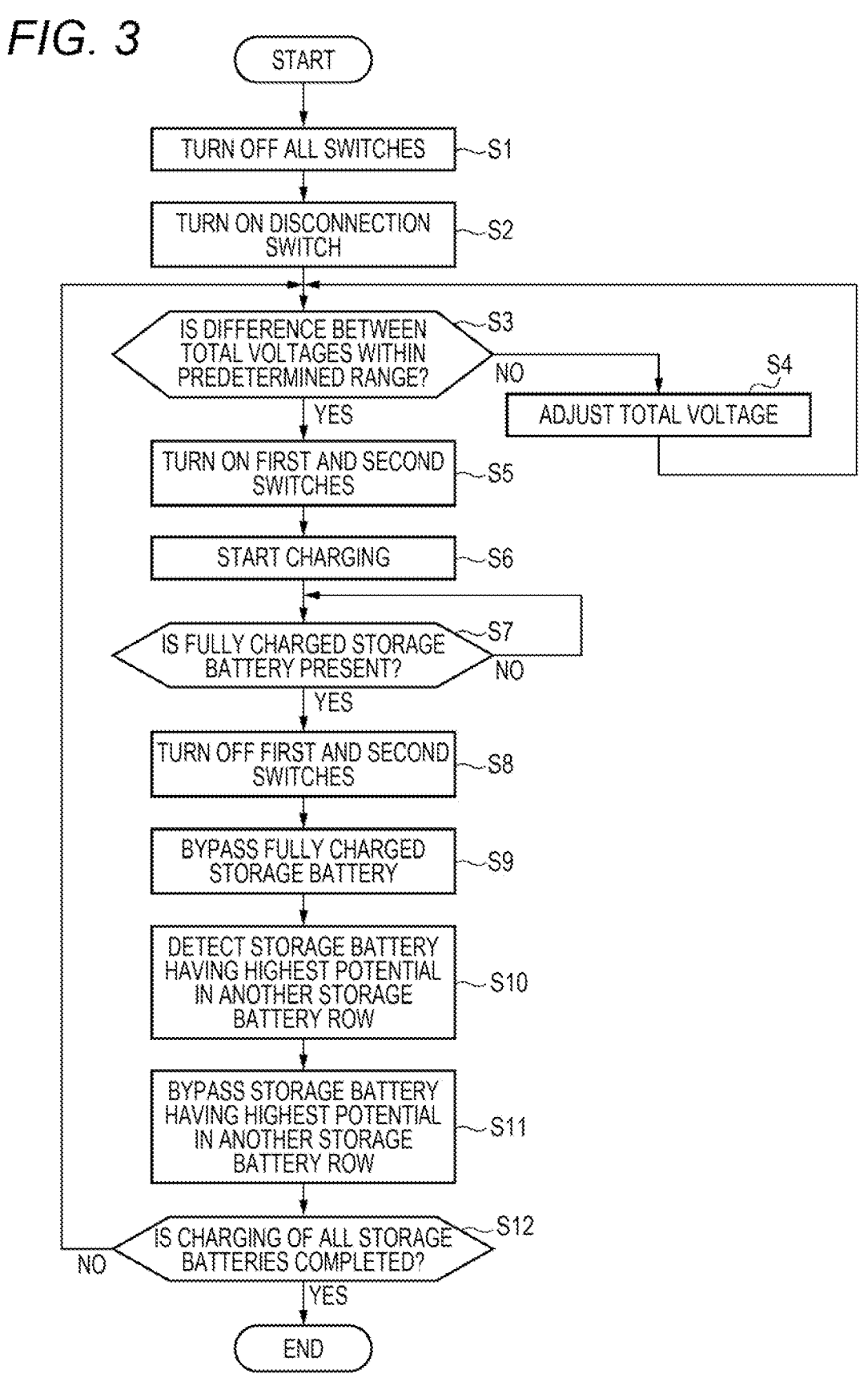
FIG. 3 is a flowchart showing charging control by the control device shown in FIG. 2.

FIG. 3 is a flowchart showing charging control by the control device 100 shown in FIG. 2. Processing shown in this flowchart is started when the energy storage system 1 is set to a charging mode, and the processing proceeds to step S1.

In step S1, the switch control unit 101 turns off the first switch S10 and the second switch S20, and the bypass control unit 104 turns off the bypass switches S1A-x, S2A-x and the disconnection switches S1B-x, S2B-x. Next, in step S2, the bypass control unit 104 turns on the disconnection switches S1B-x, S2B-x.

Next, in step S3, the total voltage determination unit 105 determines whether a difference between a total voltage of the first storage battery row 10 and a total voltage of the second storage battery row 20 is within a predetermined range. When a negative determination is made in step S3, the processing proceeds to step S4, and when an affirmative determination is made in step S3, the processing proceeds to step S5. Total voltages of the first and second storage battery rows 10, 20 in step S3 are values obtained by excluding voltages of the bypassed storage batteries C1-x, C2-x, respectively.

In step S4, the total voltage adjustment unit 106 adjusts the difference between the total voltage of the first storage battery row 10 and the total voltage of the second storage battery row 20 to be within the predetermined range by charging one of the first storage battery row 10 and the second storage battery row 20 having a lower total voltage. The total voltage adjustment unit 106 may adjust the difference between the total voltage of the first storage battery row 10 and the total voltage of the second storage battery row 20 to be within the predetermined range by discharging one of the first storage battery row 10 and the second storage battery row 20 having a higher total voltage. The processing proceeds from step S4 to step S3.

In step S5, the switch control unit 101 turns on the first switch S10 and the second switch S20. Next, in step S6, the charge and discharge circuit 15 starts charging the first storage battery row 10 and the second storage battery row 20. In this case, the first storage battery row 10 and the second storage battery row 20 are connected in parallel to the charge and discharge circuit 15.

Next, in step S7, the full charge detection unit 102 determines whether a fully charged storage battery is present among the storage batteries C1-x, C2-x connected in series and being charged, based on voltage values measured by the voltage measurement units 12, 22 and current values measured by the current measurement units 13, 23, respectively. Step S7 is repeatedly executed until an affirmative determination is made in step S7, and when the affirmative determination is made in step S7, the processing proceeds to step S8.

In step S8, the switch control unit 101 turns off the first switch S10 and the second switch S20. Next, in step S9, the bypass control unit 104 bypasses the fully charged storage batteries C1-x, C2-x. Specifically, when the fully charged storage battery C1-x is present in the first storage battery row 10, the bypass control unit 104 switches the disconnection switch S1B-x of the bypass circuit B1-x corresponding to the storage battery C1-x from ON to OFF, and then switches the bypass switch S1A-x of the bypass circuit B1-x from OFF to ON. On the other hand, when the fully charged storage battery C2-x is present in the second storage battery row 20, the bypass control unit 104 switches the disconnection switch S2B-x of the bypass circuit B2-x corresponding to the storage battery C2-x from ON to OFF, and then switches the bypass switch S2A-x of the bypass circuit B2-x from OFF to ON.

Next, in step S10, when the fully charged storage battery C1-x is detected from the first storage battery row 10 in step S7, the high potential detection unit 103 detects the storage battery C2-x having the highest potential from the second storage battery row 20 based on a voltage value measured by the voltage measurement unit 22. On the other hand, when the fully charged storage battery C2-x is detected from the second storage battery row 20 in step S7, the high potential detection unit 103 detects the storage battery C1-x having the highest potential from the first storage battery row 10 based on a voltage value measured by the voltage measurement unit 12.

Next, in step S11, the bypass control unit 104 bypasses each of the storage batteries C1-x, C2-x having the highest potential in the first storage battery row 10 or the second storage battery row 20 detected by the high potential detection unit 103. Specifically, when the storage battery C1-x having the highest potential is present in the first storage battery row 10, the bypass control unit 104 switches the disconnection switch S1B-x of the bypass circuit B1-x corresponding to the storage battery C1-x from ON to OFF, and then switches the bypass switch S1A-x of the bypass circuit B1-x from OFF to ON. On the other hand, when the storage battery C2-x having the highest potential is present in the second storage battery row 20, the bypass control unit 104 switches the disconnection switch S2B-x of the bypass circuit B2-x corresponding to the storage battery C2-x from ON to OFF, and then switches the bypass switch S2A-x of the bypass circuit B2-x from OFF to ON.

Next, in step S12, the switch control unit 101 determines whether charging of all the storage batteries C1-x, C2-x of the first storage battery row 10 and the second storage battery row 20 is completed. That is, in step S12, the switch control unit 101 determines whether all the storage batteries C1-x in the first storage battery row 10 are bypassed by the bypass circuits B1-x, and whether all the storage batteries C2-x in the second storage battery row 20 are bypassed by the bypass circuits B2-x. When a negative determination is made in step S12, the processing proceeds to step S3, and when an affirmative determination is made in step S12, the charging control ends.

As described above, the control device 100 according to the present embodiment executes charging processing, first detection processing, second detection processing, and the bypass processing. In the charging processing, the control device 100 charges a plurality of storage battery rows (the first storage battery row 10 and the second storage battery row 20) in a state in which the storage battery rows are connected in parallel by the switching unit 30. In the first detection processing, the control device 100 detects the fully charged storage batteries C1-x, C2-x during execution of the charging processing. In the second detection processing, the control device 100 detects a storage battery having the highest potential among the storage batteries C1-x, C2-x during charging of the other storage battery row (the other of the first storage battery row 10 and the second storage battery row 20) different from one storage battery row (one of the first storage battery row 10 and the second storage battery row 20) including the fully charged storage batteries C1-x, C2-x detected in the first detection processing. In a state in which the first storage battery row 10 and the second storage battery row 20 are disconnected by the switching unit 30, the control device 100 bypasses the fully charged storage batteries C1-x, C2-x detected in the first detection processing and the storage batteries C1-x, C2-x having the highest potentials detected in the second detection processing by the bypass circuits B1-x, B2-x, respectively.

That is, in the present embodiment, charging proceeds in a state in which the plurality of storage battery rows are connected in parallel, and every time the fully charged storage batteries C1-x, C2-x are detected in any one of the storage battery rows, the storage battery having the highest potential among the storage batteries C1-x, C2-x connected in the other storage battery row is detected, and these storage batteries are both bypassed by the bypass circuits B1-x, B2-x, respectively. Thereby, in one of the storage battery rows in which each of the fully charged storage batteries C1-x, C2-x is bypassed, a total voltage is reduced by an amount of each of the bypassed storage batteries C1-x, C2-x (for example, about 4 to 4.2V), whereas in the other storage battery row, a total voltage is reduced accordingly. Therefore, it is possible to suppress a difference between total voltages of the plurality of storage battery rows to be within a predetermined range, and it is possible to sufficiently suppress a circulating current between the plurality of storage battery rows even when the plurality of storage battery rows are connected in parallel by the switching unit 30. Therefore, it is possible to achieve collective charging in a state in which the plurality of storage battery rows are connected, and to achieve simultaneous discharging of the plurality of storage battery rows connected in parallel when switching from a charging mode to a discharging mode, that is, to achieve a large output by parallel operation of the plurality of storage battery rows.

In the present embodiment, the plurality of storage battery rows are connected in parallel and collectively charged, and the fully charged storage batteries C1-x, C2-x and the storage batteries C1-x, C2-x having the highest potentials in the storage battery rows are bypassed. Thereby, even when a charging balance is lost due to variations in capacities and temperatures of the storage batteries C1-x, C2-x, all the storage batteries C1-x, C2-x can be fully charged. Since all the storage batteries C1-x, C2-x can be fully charged, the total capacity of the mounted storage batteries C1-x, C2-x can be used up.

In the present embodiment, the control device 100 executes first determination processing and first adjustment processing. First, in the first determination processing, the control device 100 determines whether a difference between total voltages of the plurality of storage battery rows is within a predetermined range before a start of charging (before the first switch S10 and the second switch S20 are turned on). When it is determined in the first determination processing that the difference between the total voltages of the plurality of storage battery rows is out of the predetermined range, the control device 100 adjusts the difference between the total voltages of the plurality of storage battery rows to be within the predetermined range in the first adjustment processing, for example, by performing auxiliary charging on the storage battery row having a higher total voltage. Thereby, when charging is started in a state in which the plurality of storage battery rows are connected in parallel, it is possible to suppress a circulating current between the plurality of storage battery rows to an allowable range.

In the present embodiment, the control device 100 executes second determination processing and second adjustment processing. First, in the second determination processing, the control device 100 determines whether a difference between total voltages of the plurality of storage battery rows is within a predetermined range after bypass processing. When it is determined in the second determination processing that the difference between the total voltages of the plurality of storage battery rows (a value excluding the bypassed storage batteries C1-x, C2-x) is out of the predetermined range, the control device 100 adjusts the difference between the total voltages of the plurality of storage battery rows to be within the predetermined range in the second adjustment processing, for example, by performing auxiliary charging on the storage battery row having a higher total voltage. Thereby, when charging is restarted by connecting the plurality of storage battery rows in parallel after the bypass processing, it is possible to suppress a circulating current between the plurality of storage battery rows to an allowable range.

Although the present disclosure has been described above based on the embodiment, the present disclosure is not limited to the above embodiment, and modifications may be made or known or well-known techniques may be appropriately combined without departing from the scope of the present disclosure.

For example, in the above embodiment, the energy storage system 1 including two storage battery rows, the first storage battery row 10 and the second storage battery row 20, has been described as an example, and the present disclosure can also be applied to an energy storage system including three or more storage battery rows. In the energy storage system including three or more storage battery rows, the control device 100 charges the three or more storage battery rows in a state in which the three or more storage battery rows are connected by the switching unit 30 in charging processing, and detects a storage battery having the highest potential among storage batteries being charged in all the other storage battery rows different from one storage battery row including a fully charged storage battery in second detection processing. The control device 100 bypasses the fully charged storage battery of the one storage battery row and bypasses the storage battery having the highest potential among all the other storage battery rows in a state in which all the three or more storage battery rows are disconnected by the switching unit 30.

In the above embodiment, the energy storage system 1 using used storage batteries has been described as an example, but the present disclosure can also be applied to an energy storage system using new storage batteries. Even when the storage batteries to be used are new, capacities of the storage batteries are different due to manufacturing variations and variations in deterioration caused by use, and thus effects the same as those of the above embodiment are achieved by applying the present disclosure.

In the above embodiment, processing of adjusting the difference between the total voltages of the plurality of storage battery rows to be within the predetermined range is executed, but execution of the processing is not essential. For example, when the total voltages of the plurality of storage battery rows are substantially equal to each other after discharging, if the assumed total voltage difference is small and the circulating current does not exceed the allowable range, execution of the processing is unnecessary.

Here, characteristics of the embodiment of the storage battery control device, the energy storage system, and the storage battery control method according to the present disclosure described above are summarized briefly in the following [1] to [5].

[1] A storage battery control device (100) configured to control an energy storage system (1) including: a plurality of storage battery rows (10, 20) connected in parallel, each of the storage battery rows (10, 20) including a plurality of storage batteries (C1-1 to C1-n, C2-1 to C2-n) connected in series and a plurality of bypass units (B1-1 to B1-n, B2-1 to B2-n, B1-x, B2-x) each of which bypasses corresponding one of the storage batteries (C1-1 to C1-n, C2-1 to C2-n); and a switching unit (30) configured to switch connection and disconnection of the plurality of storage battery rows (10, 20), in which the storage battery control device (100) executes:

charging processing of charging the plurality of storage battery rows (10, 20) in a state in which the plurality of storage battery rows (10, 20) are connected in parallel by the switching unit (10);

first detection processing of detecting a fully charged storage battery (C1-x, C2-x) during execution of the charging processing;

second detection processing of detecting a storage battery (C2-x, C1-x) having a highest potential among the storage batteries (C1-x, C2-x) being charged in another storage battery row (20,10) different from the storage battery row (10,20) including the fully charged storage battery (C1-x, C2-x) detected in the first detection processing among the plurality of storage battery rows (10, 20); and bypass processing of bypassing the storage battery (C1-x, C2-x) detected in the first detection processing and all storage batteries (C1-x, C2-x) detected in the second detection processing by the bypass units (B1-x, B2-x) in a state in which the plurality of storage battery rows (10, 20) are disconnected by the switching unit (30).

[2] The storage battery control device (100) according to above [1], in which the storage battery control device (100) executes:

first determination processing of determining whether a difference between total voltages of the plurality of storage battery rows (10, 20) is within a predetermined range before the execution of the charging processing; and first adjustment processing of adjusting the difference between the total voltages of the plurality of storage battery rows (10, 20) to be within the predetermined range in a case that it is determined in the first determination processing that the difference between the total voltages of the plurality of storage battery rows (10, 20) is out of the predetermined range.

[3] The storage battery control device (100) according to above [2], in which the storage battery control device (100) executes:

second determination processing of determining whether a difference between total voltages of the plurality of storage battery rows (10, 20) is within a predetermined range after execution of the bypass processing; and second adjustment processing of adjusting the difference between the total voltages of the plurality of storage battery rows (10, 20) to be within the predetermined range in a case that it is determined in the second determination processing that the difference between the total voltages of the plurality of storage battery rows (10, 20) is out of the predetermined range.

[4] An energy storage system (1) including:

a plurality of storage battery rows (10, 20) connected in parallel, each of the storage battery rows (10, 20) including a plurality of storage batteries (C1-1 to C1-n, C2-1 to C2-n) connected in series and a plurality of bypass units (B1-1 to B1-n, B2-1 to B2-n, B1-x, B2-x) each of which bypasses corresponding one of the storage batteries (C1-1 to C1-n, C2-1 to C2-n);

a switching unit (30) configured to switch connection and disconnection of the plurality of storage battery rows (10, 20); and a control device (100) configured to control the bypass units (B1-1 to B1-n, B2-1 to B2-n, B1-x, B2-x) and the switching unit (30), in which the control device (100) executes:

charging processing of charging the plurality of storage battery rows (10, 20) in a state in which the plurality of storage battery rows (10, 20) are connected in parallel by the switching unit (30);

first detection processing of detecting a fully charged storage battery (C1-x, C2-x) during execution of the charging processing;

second detection processing of detecting a storage battery (C2-x, C1-x) having a highest potential among the storage batteries (C1-x, C2-x) being charged in another storage battery row (20, 10) different from the storage battery row (10, 20) including the fully charged storage battery (C1-x, C2-x) detected in the first detection processing among the plurality of storage battery rows (10, 20); and bypass processing of bypassing the storage battery (C1-x, C2-x) detected in the first detection processing and all storage batteries (C2-x, C1-x) detected in the second detection processing by the bypass units (B1-x, B2-x) in a state in which the plurality of storage battery rows (10, 20) are disconnected by the switching unit (30).

[5] A storage battery control method for controlling an energy storage system (1) using a computer, the energy storage system (1) including: a plurality of storage battery rows (10, 20) connected in parallel, each of the storage battery rows (10, 20) including a plurality of storage batteries (C1-1 to C1-n, C2-1 to C2-n) connected in series and a plurality of bypass units (B1-1 to B1-n, B2-1 to B2-n, B1-x, B2-x) each of which bypasses corresponding one of the storage batteries (C1-1 to C1-n, C2-1 to C2-n); and a switching unit (30) configured to switch connection and disconnection of the plurality of storage battery rows (10, 20), the storage battery control method including:

charging processing of charging the plurality of storage battery rows (10, 20) in a state in which the plurality of storage battery rows (10, 20) are connected in parallel by the switching unit (30);

first detection processing of detecting a fully charged storage battery (C1-x, C2-x) during execution of the charging processing;

second detection processing of detecting a storage battery (C2-x, C1-x) having a highest potential among the storage batteries (C1-x, C2-x) being charged in another storage battery row (20, 10) different from the storage battery row (10, 20) including the fully charged storage battery (C1-x, C2-x) detected in the first detection processing among the plurality of storage battery rows (10, 20); and bypass processing of bypassing the storage battery (C1-x, C2-x) detected in the first detection processing and all storage batteries (C2-x, C1-x) detected in the second detection processing by the bypass units (B1-x, B2-x) in a state in which the plurality of storage battery rows (10, 20) are disconnected by the switching unit (30).

What is claimed is:

1. A storage battery control device configured to control an energy storage system including: a plurality of storage battery rows connected in parallel, each of the storage battery rows including a plurality of storage batteries connected in series and a plurality of bypass units each of which bypasses corresponding one of the storage batteries; and a switching unit configured to switch connection and disconnection of the plurality of storage battery rows, wherein the storage battery control device executes:

charging processing of charging the plurality of storage battery rows in a state in which the plurality of storage battery rows are connected in parallel by the switching unit;

first detection processing of detecting a fully charged storage battery during execution of the charging processing;

in response to the first detection processing, second detection processing of detecting a storage battery having a highest potential among the storage batteries being charged but not yet fully charged in another storage battery row different from the storage battery row including the fully charged storage battery detected in the first detection processing among the plurality of storage battery rows; and bypass processing of bypassing, based on detections from the first detection processing and the second detection processing, the storage battery detected in the first detection processing and all storage batteries detected in the second detection processing by the bypass units in a state in which the plurality of storage battery rows are disconnected by the switching unit.

2. The storage battery control device according to claim 1, wherein the storage battery control device executes:

first determination processing of determining whether a difference between total voltages of the plurality of storage battery rows is within a predetermined range before the execution of the charging processing; and first adjustment processing of adjusting the difference between the total voltages of the plurality of storage battery rows to be within the predetermined range based on a determination in the first determination processing that the difference between the total voltages of the plurality of storage battery rows is out of the predetermined range.

3. The storage battery control device according to claim 2, wherein the storage battery control device executes:

second determination processing of determining whether a difference between total voltages of the plurality of storage battery rows is within the predetermined range after execution of the bypass processing; and second adjustment processing of adjusting the difference between the total voltages of the plurality of storage battery rows to be within the predetermined range based on a determination in the second determination processing that the difference between the total voltages of the plurality of storage battery rows is out of the predetermined range.

4. The storage battery control device according to claim 3, wherein, in the second determination processing, the total voltages of the plurality of storage battery rows after execution of the bypass processing are total voltages excluding voltages of bypassed storage batteries.

5. An energy storage system comprising:

a plurality of storage battery rows connected in parallel, each of the storage battery rows including a plurality of storage batteries connected in series and a plurality of bypass units each of which bypasses corresponding one of the storage batteries;

a switching unit configured to switch connection and disconnection of the plurality of storage battery rows; and a control device configured to control the bypass units and the switching unit, wherein the control device executes:

charging processing of charging the plurality of storage battery rows in a state in which the plurality of storage battery rows are connected in parallel by the switching unit;

first detection processing of detecting a fully charged storage battery during execution of the charging processing;

in response to the first detection processing, second detection processing of detecting a storage battery having a highest potential among the storage batteries being charged but not yet fully charged in another storage battery row different from the storage battery row including the fully charged storage battery detected in the first detection processing among the plurality of storage battery rows; and bypass processing of bypassing, based on detections from the first detection processing and the second detection processing, the storage battery detected in the first detection processing and all storage batteries detected in the second detection processing by the bypass units in a state in which the plurality of storage battery rows are disconnected by the switching unit.

6. A storage battery control method for controlling an energy storage system using a computer, the energy storage system including: a plurality of storage battery rows connected in parallel, each of the storage battery rows including a plurality of storage batteries connected in series and a plurality of bypass units each of which bypasses corresponding one of the storage batteries; and a switching unit configured to switch connection and disconnection of the plurality of storage battery rows, the storage battery control method comprising:

charging processing of charging the plurality of storage battery rows in a state in which the plurality of storage battery rows are connected in parallel by the switching unit;

first detection processing of detecting a fully charged storage battery during execution of the charging processing;

in response to the first detection processing, second detection processing of detecting a storage battery having a highest potential among the storage batteries being charged but not yet fully charged in another storage battery row different from the storage battery row including the fully charged storage battery detected in the first detection processing among the plurality of storage battery rows; and bypass processing of bypassing, based on detections from the first detection processing and the second detection processing, the storage battery detected in the first detection processing and all storage batteries detected in the second detection processing by the bypass units in a state in which the plurality of storage battery rows are disconnected by the switching unit.

* * * * *